(12) United States Patent
Krithivasan et al.

(10) Patent No.: US 7,797,366 B2
(45) Date of Patent: Sep. 14, 2010

(54) POWER-EFFICIENT SIGN EXTENSION FOR BOOTH MULTIPLICATION METHODS AND SYSTEMS

(75) Inventors: Shankar Krithivasan, Austin, TX (US);
Christopher Edward Koob, Round Rock, TX (US); William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1028 days.

(21) Appl. No.: 11/356,359

(22) Filed: Feb. 15, 2006

(65) Prior Publication Data

US 2007/0192399 A1 Aug. 16, 2007

(51) Int. Cl.
*G06F 7/52* (2006.01)
(52) U.S. Cl. ........................ 708/628; 708/629
(58) Field of Classification Search ......... 708/620–632
See application file for complete search history.

(56) References Cited

U.S. PATENT DOCUMENTS

| | | | | |
|---|---|---|---|---|
| 4,748,582 | A | * | 5/1988 | New et al. .................. 708/625 |
| 4,813,008 | A | | 3/1989 | Shigehara |
| 4,901,307 | A | | 2/1990 | Gilhousen et al. |
| 4,910,701 | A | * | 3/1990 | Gibbons et al. ............. 708/630 |
| 5,103,459 | A | | 4/1992 | Gilhousen et al. |
| 5,150,322 | A | | 9/1992 | Smith et al. |
| 5,220,525 | A | | 6/1993 | Anderson et al. |
| 5,506,799 | A | * | 4/1996 | Nakao ........................ 708/628 |
| 5,880,985 | A | * | 3/1999 | Makineni et al. ............ 708/625 |
| 5,928,316 | A | * | 7/1999 | Wong et al. ................. 708/501 |

(Continued)

FOREIGN PATENT DOCUMENTS

EP 0497622 8/1992

(Continued)

OTHER PUBLICATIONS

International Search Report-PCT/US07/062256, International Search Authority-European Patent Office-Jun. 29, 2007.

(Continued)

*Primary Examiner*—Tan V Mai
(74) *Attorney, Agent, or Firm*—Peter M. Kamarchik; Nicholas J. Pauley; Sam Talpalatsky

(57) ABSTRACT

Techniques for the design and use of a digital signal processor, including processing transmissions in a communications (e.g., code division multiple access) system. Power-efficient sign extension for Booth multiplication processes involves applying a sign bit in a Booth multiplication tree. The sign bit allows the Booth multiplication process to perform a sign extension step. This further involves one-extending a predetermined partial product row of the Booth multiplication tree using a sign bit for preserving the correct sign of the predetermined partial product row. The process and system resolve the signal value of the sign bit by generating a sign-extension bit in the Booth multiplication tree. The sign-extension bit is positioned in a carry-out column to extend the product of the Booth multiplication process. Then, the method and system form a final product from the Booth multiplication tree by adding the carry-out value to the sign bit positioned at least a predetermined column of the Booth multiplication tree. The result is to effectively extend the sum component of the final product with the sign and zero-extending the carry component of the final product.

24 Claims, 8 Drawing Sheets

U.S. PATENT DOCUMENTS

| | | |
|---|---|---|
| 6,157,939 A | 12/2000 | Vo |
| 6,167,422 A | 12/2000 | Purcell et al. |
| 6,183,122 B1 | 2/2001 | De Angel |
| 6,463,453 B1 | 10/2002 | Dang |
| 2007/0192398 A1 | 8/2007 | Krithivasan et al. |

FOREIGN PATENT DOCUMENTS

| | | |
|---|---|---|
| EP | 0840207 | 5/1998 |
| EP | 0 992 885 | 12/2000 |
| JP | 01-116764 | 5/1989 |
| JP | 04-246723 | 9/1992 |
| JP | 06-348455 | 12/1994 |
| JP | 10-133856 | 5/1998 |
| JP | 10-143355 | 5/1998 |
| JP | 10-333885 | 12/1998 |
| JP | 11-134175 | 5/1999 |
| JP | 2002-157114 | 5/2002 |
| WO | WO 01/27742 | 4/2001 |

OTHER PUBLICATIONS

Written Opinion-PCT/US07/062256, International Search Authority-European Patent Office-Jun. 29, 2007.

* cited by examiner

| B[2n+1:2n-1] | MULTIPLE OF A |
|---|---|
| 000, 111 | 0 |
| 001, 010 | 1 |
| 011 | 2 |
| 100 | -2 |
| 101, 110 | -1 |

| MULT FACTOR | UNSIGNED(n8=0) | UNSIGNED(n8=1) | SIGNED(n8=0) | SIGNED(n8=1) |
|---|---|---|---|---|
| +2 | {1, 0, 0, a} | {1, 0, 0, ~a} | {~a, a, a, a} | {1, 0, 0, ~a} |
| +1/+0 | {1, 0, 0, 0} | {1, 0, 0, 1} | {~a, a, a, a} | {1, 0, 0, ~a} |
| −1/−0 | {0, 1, 1, 1} | {1, 0, 0, 0} | {~a, a, a, a} | {1, 0, 0, ~a} |
| −2 | {0, 1, 1, ~a} | {~a, a, a, a} | {~a, a, a, a} | {1, 0, 0, ~a} |

POWER-EFFICIENT SIGN EXTENSION FOR BOOTH MULTIPLICATION METHODS AND SYSTEMS

RELATED APPLICATIONS

This application is related to co-pending U.S. patent application Ser. No. 11/355,397, filed Feb. 15, 2006 and entitled "A BOOTH MULTIPLIER WITH ENHANCED REDUCTION TREE CIRCUITRY".

FIELD

The present invention relates to the field of math processors in digital signal processors, and more particularly, to Booth multipliers used in math processors to perform high speed multiplication of numbers. More specifically, the present invention relates to power-efficient sign extension for signed and un-signed binary values for use in booth multiplication methods and systems.

DESCRIPTION OF THE RELATED ART

Increasingly, electronic equipment and supporting software applications involve digital signal processing. Home theatre, computer graphics, medical imaging and telecommunications all rely on digital signal processing technology. Digital signal processing requires fast math in complex, but repetitive algorithms. Many applications require computations in real-time, i.e., the signal is a continuous function of time, which must be sampled and converted to digital, for numerical processing. The processor must execute algorithms performing discrete computations on the samples as they arrive. The architecture of a digital signal processor, or DSP, is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communication between users over a satellite or terrestrial link. The use of CDMA processes in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more telecommunications, and now streaming video, standards. One such first generation standard is the "TIA/EIA/IS-95 Terminal-Base Station Compatibility Standard for Dual-mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "3rd Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard. There are also video compression standards, such as MPEG-1, MPEG-2, MPEG-4, H.263, and WMV (Windows Media Video), as well as many others that such wireless handsets will increasingly employ.

In order to accomplish fast and flexible arithmetic computation units, there is the need to perform high-speed multiplication operations. One process for performing such operations is known as Booth multiplication. Booth multiplication is a process that allows for smaller, faster multiplication circuits, by recoding the numbers that are multiplied. Multiplication, using the Booth process is typically performed by the generation of partial products. The partial products are then added to obtain the final result. With the Booth multiplication process, the number of partial products equals the number of rows in a multiplier matrix. The term "partial product" refers to a row in the multiplication tree.

There exist numerous modifications to the original Booth's algorithm, but the fundamental principle is to generate fewer partial products using the Booth encoding process. It is possible to reduce the number of partial products by approximately half by using the process of radix-4 Booth recoding. Radix-4 Booth recoding maps the bits of multiplier B, which are originally represented in binary values of 0 and 1 into a set of multiplication factors which can take the values of −2, −1, 0, 1 or 2. This method provides the benefit of approximately halving the number of partial products that would otherwise occur. This is important in circuit design as it relates to the propagation delay in the running of the circuit, and the complexity and power consumption of its implementation. There is comparatively little complexity penalty in multiplying by 0, 1 or 2, and only a multiplexer or equivalent.

Once the partial products have been generated using the process of Booth encoding, they are added together by employing reduction techniques. The process of reduction involves summing the multiple rows of partial product bits in a parallel process using half-adders, full-adders and multi-operand adders. This reduction results in two rows of bits said to be in the redundant format, whose sum, when resolved using a carry propagate adder represents the final product. One of these rows is called the Sum S and the other row is called Carry C. In multiply-accumulate (MAC) operations, the Z term in [Z+(A×B)] is typically included in the reduction tree prior to the final CPA. This process saves on employing CPAs both for the resolution of the multiplication product in the redundant format and for the subsequent accumulation.

Since some partial products may be negative, the hardware required for two's complementation is an aspect of the Booth multiplier. With such hardware, there is a need to provide a Booth multiplier capable of generating the of the multiplication product. Presently, no known method or system exists which is capable of generating −(A×B) efficiently for DSP applications. Accordingly, a need exists for a method and system capable of using the Booth multiplication process for generating the additive inverse of the product, −(A×B), in DSP applications.

Once such a product is generated, however, there is the problem that if the value to be accumulated, "Z" to the product of a multiplication "A×B," is of a higher bit-width than the product A×B, then both the "sum" and "carry" components of the redundant product need to be sign extended appropriately.

Sometimes, it may be necessary to perform sign extension over a wide range of bits. There is, accordingly the need for a process of appropriate sign extension during Booth multiplication processes in a DSP. Typically both of the intermediate redundant products of a multiplication will be sign extended.

There is a further need for a power-efficient process for the situation of only the sum component of the redundant product needing to be sign extended.

There is a need to avoid sign-extending both the sum and carry component in the generation of a final product from a Booth multiplication process.

There is a further need for reducing the power consumption arising from sign-extending the partial products of intermediate 32-bit product during a Booth multiplication process.

There is yet a need for reducing the number of multiplexing circuits operating during the sign extension phase of Booth multiplication.

SUMMARY

Techniques for providing a power-efficient sign extension for booth multiplication methods and systems are disclosed, which processes improve both the operation of a digital signal processor and the efficient use of digital signal processor instructions for processing increasingly robust software applications for personal computers, personal digital assistants, wireless handsets, and similar electronic devices, as well as increasing the associated digital signal processor speed and service quality.

According to one aspect, the disclosed method and system includes a power-efficient sign extension method and system for a Booth multiplication process. The disclosed subject matter introduces a sign bit in a Booth multiplication tree comprising a plurality of partial product rows. The sign bit is useful in the event of the Booth multiplication process requiring a sign extension step. The method and system here disclosed includes the ability to one-extend (i.e., sign extend when the sign is "1") a predetermined partial product row of the Booth multiplication tree using a sign bit for preserving the correct sign of the predetermined partial product row. Resolving the signal value of the sign bit entails generating a sign-extension bit in the Booth multiplication tree. The sign-extension bit may be positioned in a carry-out column to extend the product of the Booth multiplication process. Then the disclosure forms a final product from the Booth multiplication tree by adding the carry-out value to the sign bit to at least a predetermined column of the Booth multiplication tree. This has the effect of extending the sum component of the final product with the sign and zero-extending the carry component of the final product.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings wherein like reference characters identify correspondingly throughout and wherein.

Figure 3:
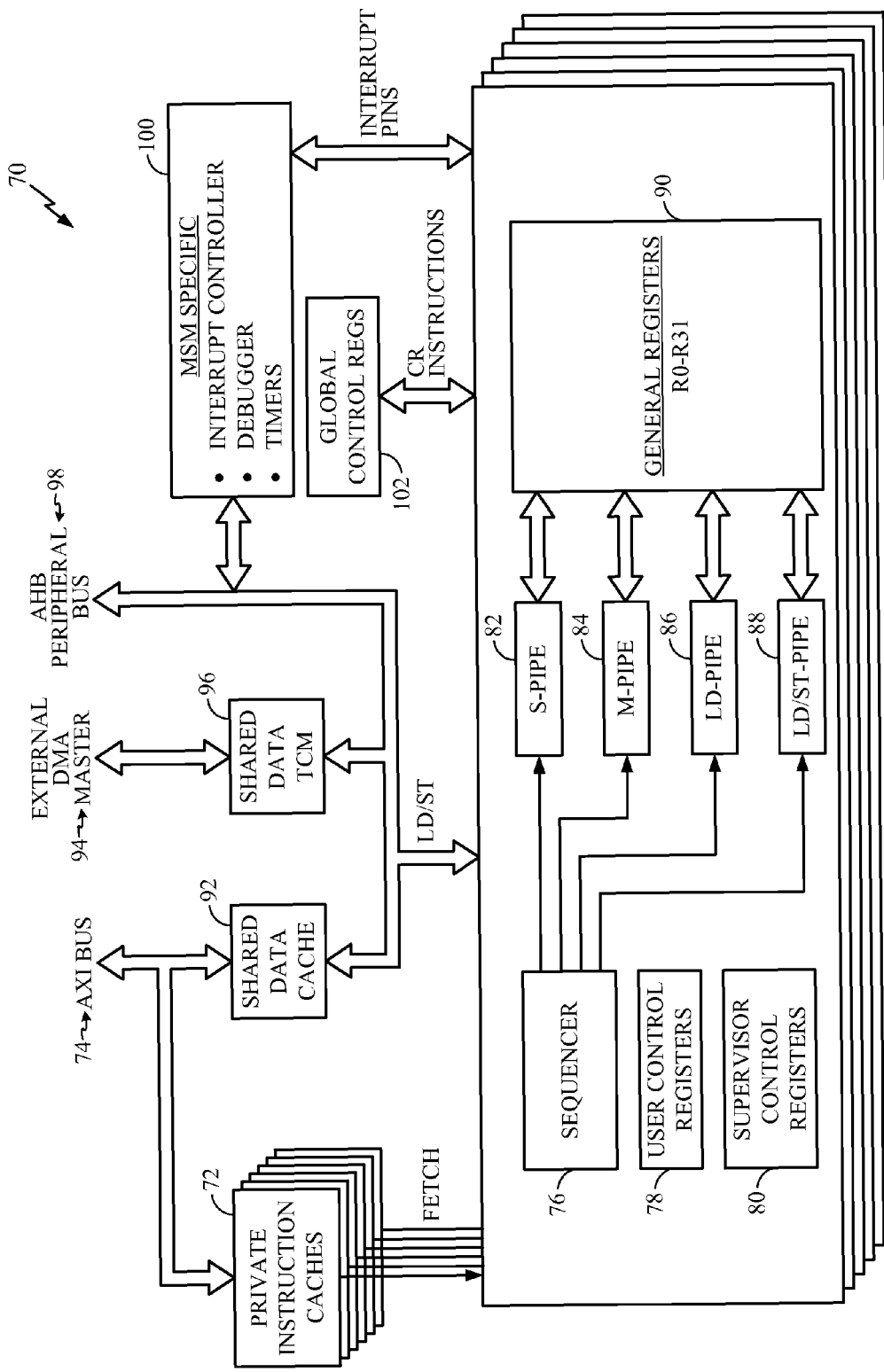
Figure 4:
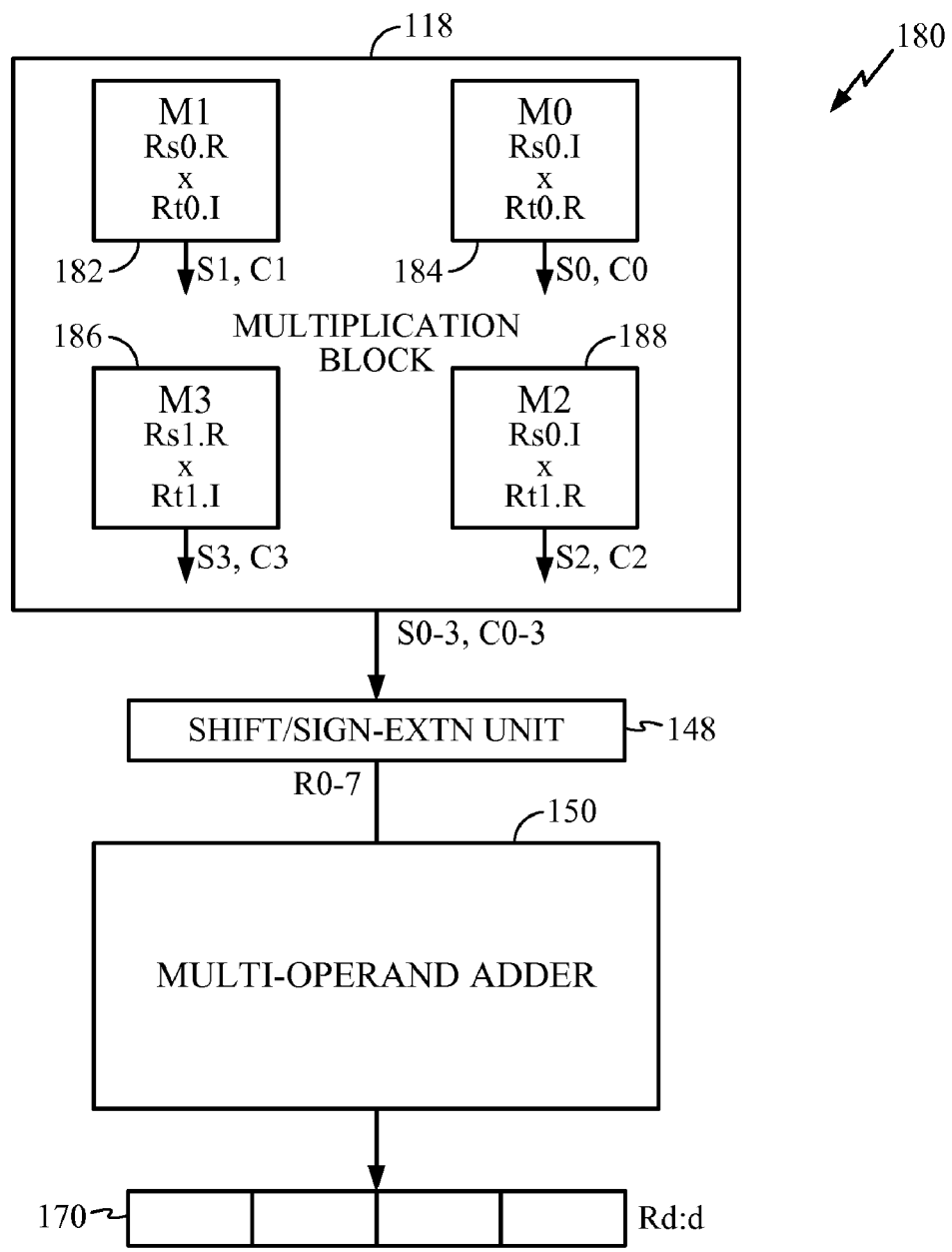
Figure 5:
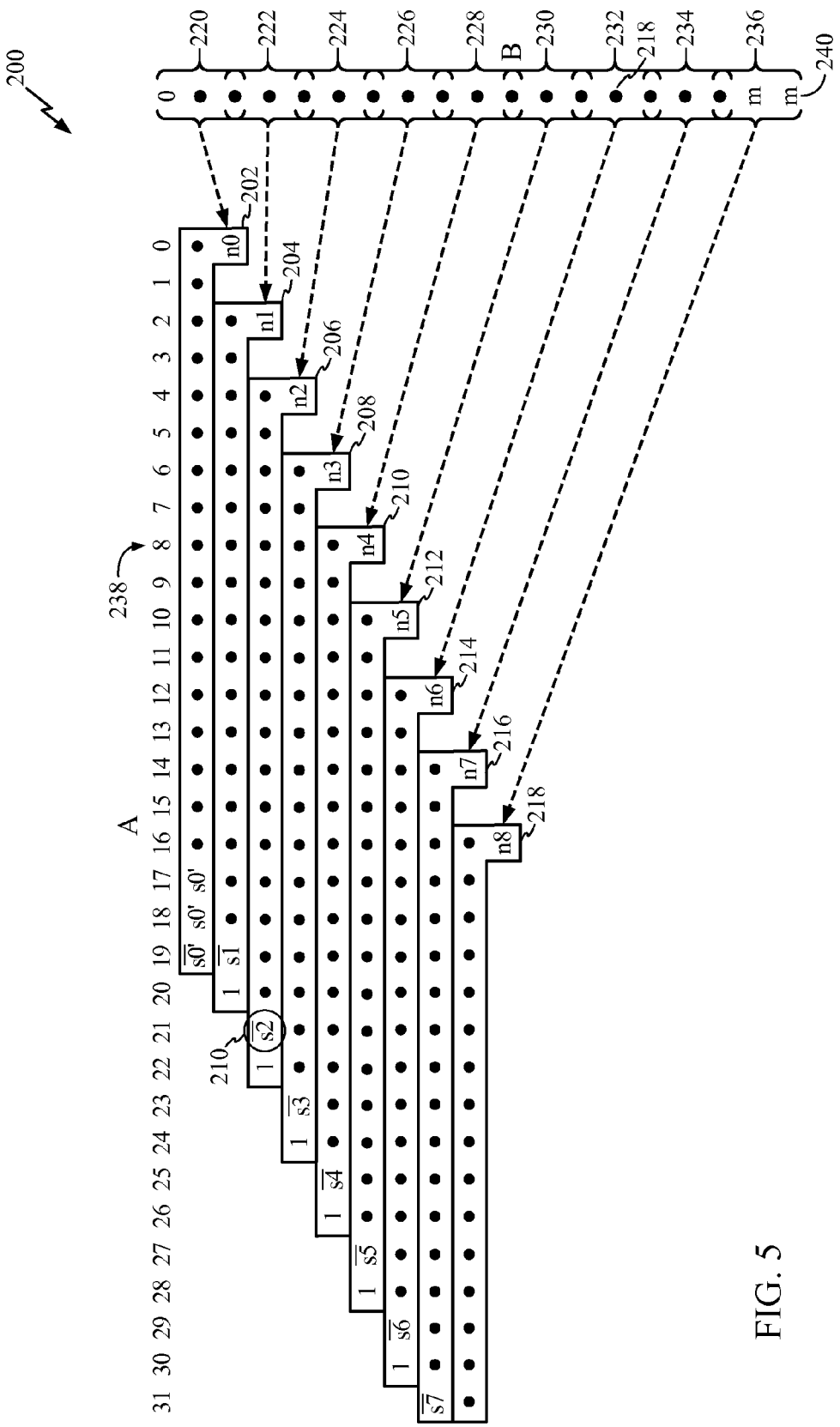
Figures 6, 7:
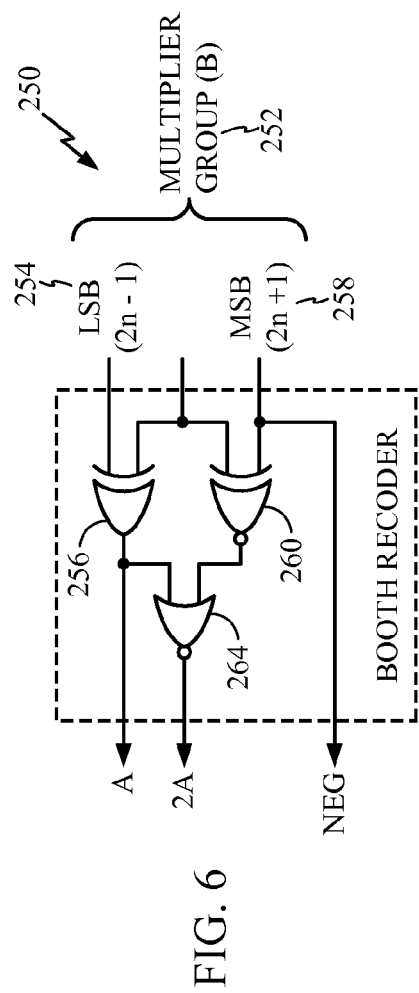
Figures 8, 9:
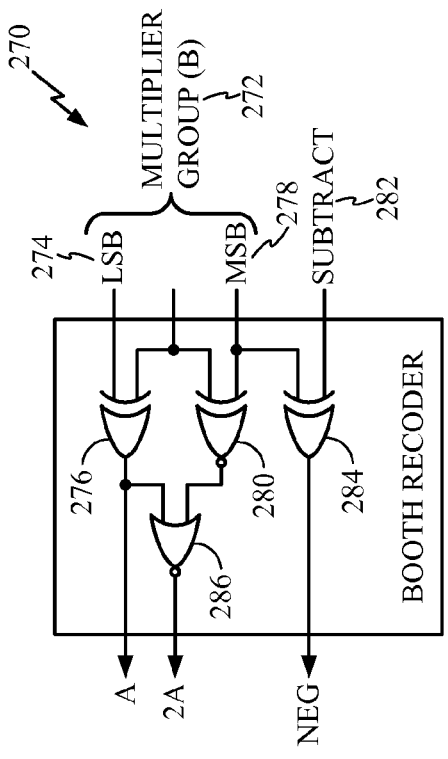
Figure 10:
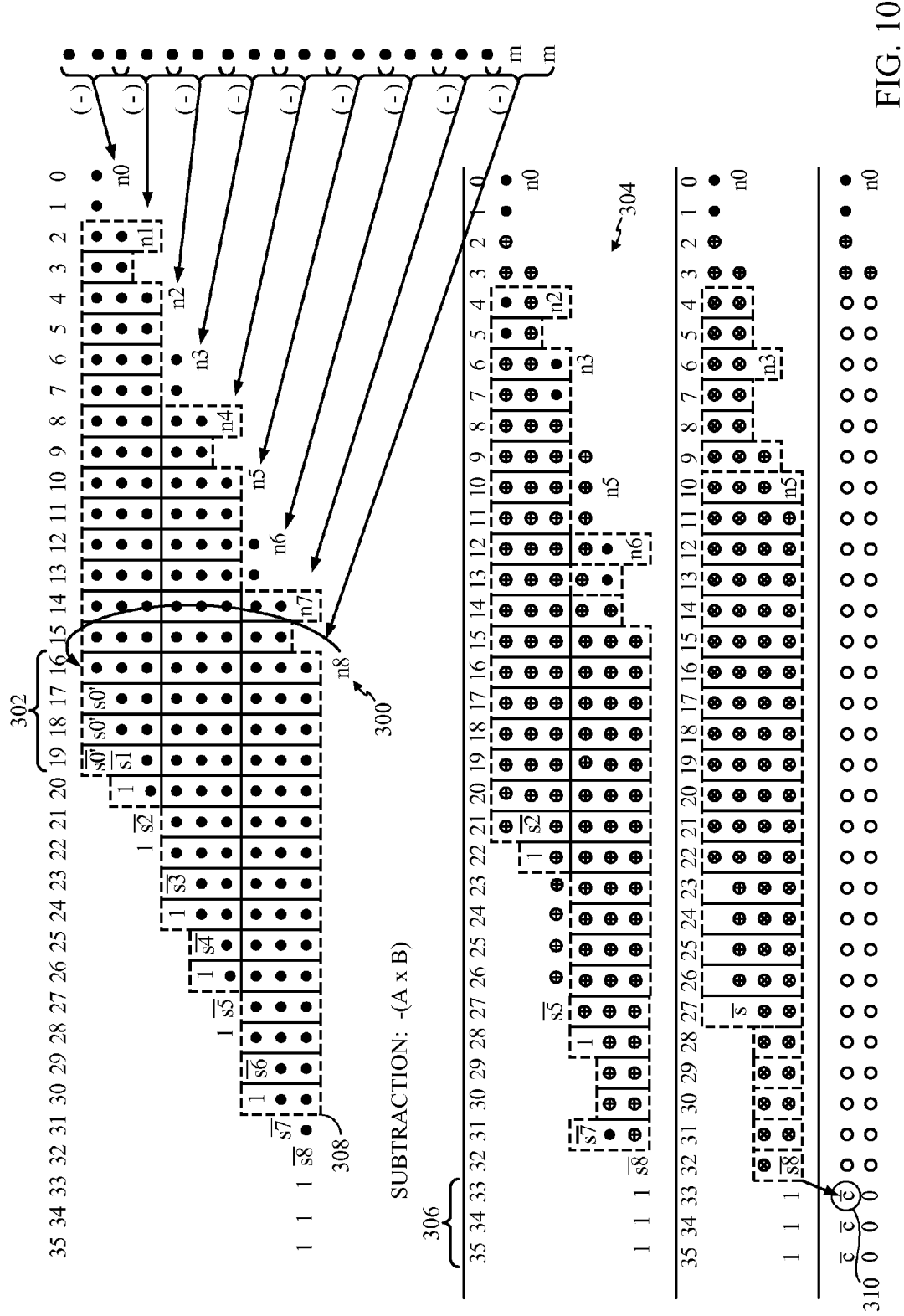

FIG. 3 provides an architecture block diagram of one embodiment of a digital signal processor providing the technical advantages of the disclosed subject matter;

FIG. 4 presents a data path diagram for various implementations of the disclosed subject matter;

FIG. 5 presents a modified 16×16 radix-4 Booth multiplication tree applicable to the disclosed subject matter;

FIG. 6 provides a logic cell for implementing the Booth recoder for the disclosed subject matter;

FIG. 7 provides a description of the bit grouping for the logic cell of FIG. 7 with the disclosed subject matter;

FIG. 8 presents a logic cell for implementing Booth recoding logic for the −(A×B) product;

FIG. 9 is a table of how the disclosed subject matter handles subtraction in Booth multiplication; and FIG. 10 shows a 16×16 Booth multiplication reduction tree according to further teachings of the disclosed subject matter.

DETAILED DESCRIPTION OF THE SPECIFIC EMBODIMENTS

The disclosed subject matter for the power-efficient sign extension for booth multiplication methods and systems here presented has use in a very wide variety of digital signal processing applications, including those involving multi-threaded processing. One such application appears in telecommunications and, in particular, in wireless handsets that employ one or more digital signal processing circuits. Consequently, the following FIGS. 1 through 3 describe a telecommunications DSP within which the present teachings may be useful. FIG. 4 sets forth a data path for multiplication processing within which the present disclosure of an enhanced Booth multiplication operation may operate. Remember, however, that the implementation here described provides but one of a virtually limitless set of applications to which the disclosed subject matter may apply.

Figure 1:
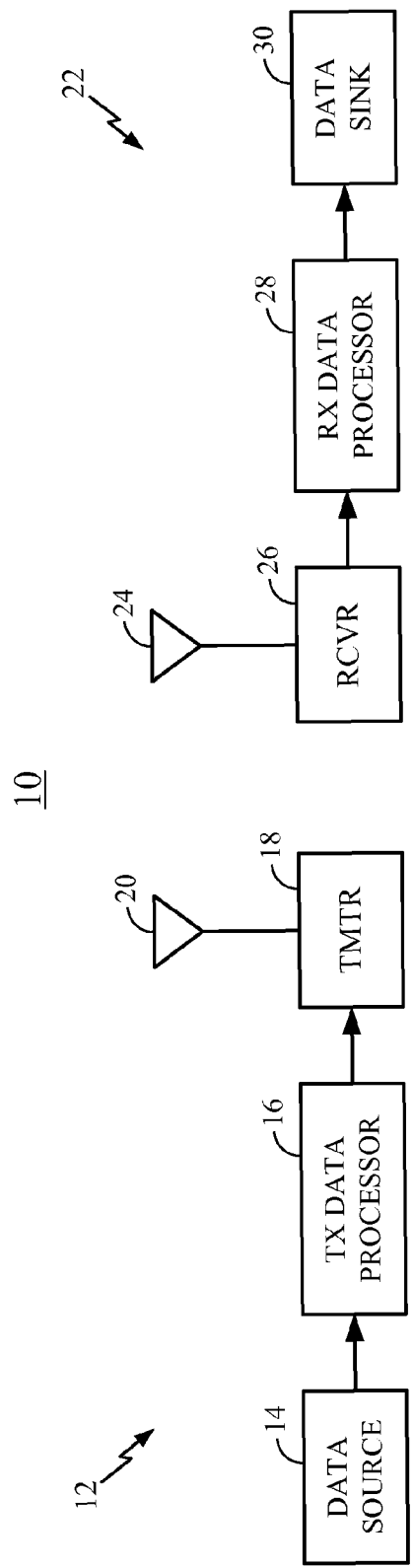
FIG. 1 is a simplified block diagram of a communications system that can implement the present embodiment.

For the purpose of explaining how such a wireless handset may be used, FIG. 1 provides a simplified block diagram of a communications system 10 that can implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The encoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
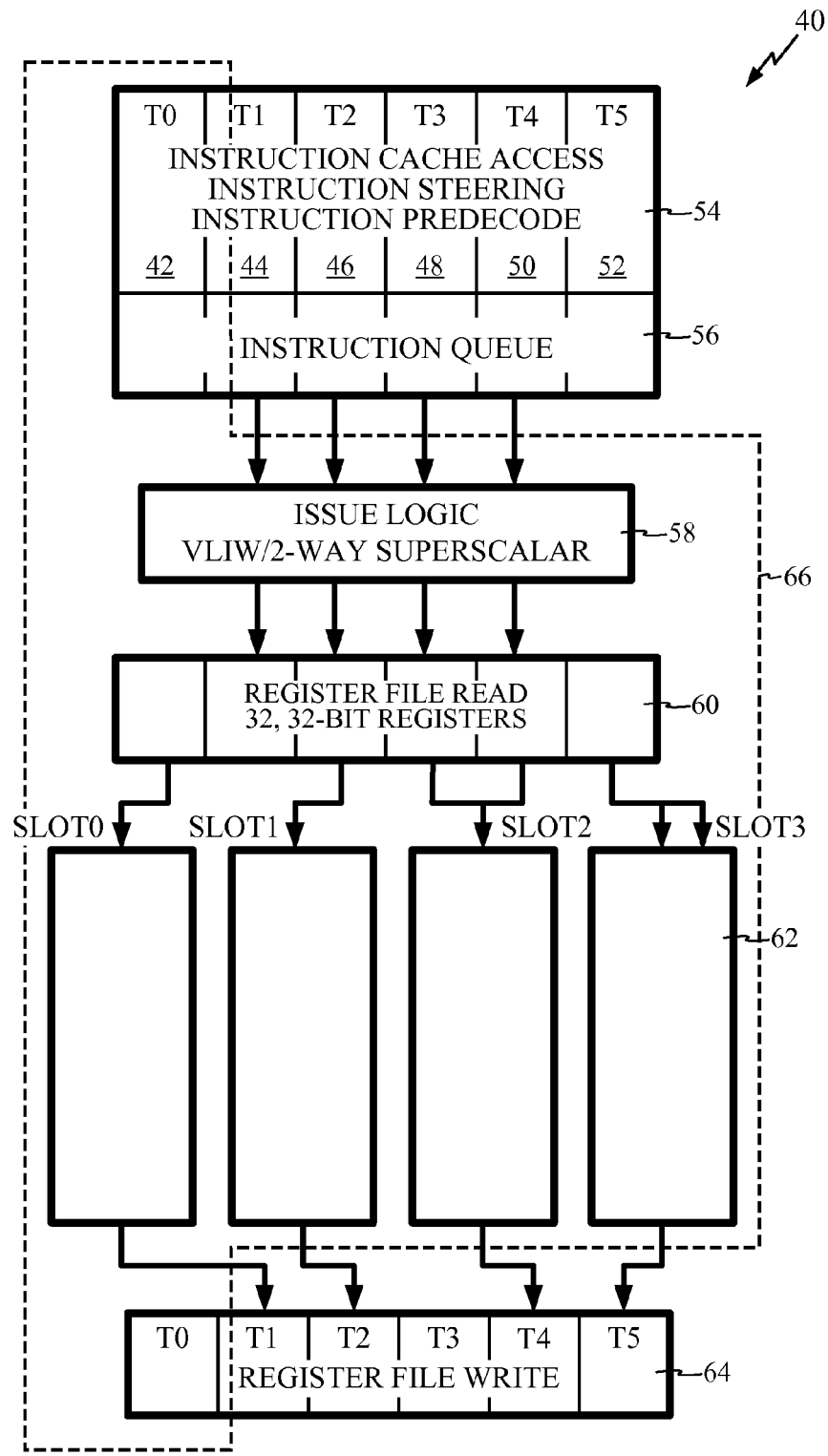
FIG. 2 illustrates a DSP architecture for carrying forth the teachings of the present embodiment.

FIG. 2 illustrates DSP 40 architecture that may serve as the transmit data processor 16 and receive data processor 28 of FIG. 1. Once more, emphasis is made that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of selected thread is read and read data is sent to execution data paths 62 for SLOT0 through SLOT3. SLOT0 through SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 being portioned according to the various threads forms a processing pipeline 66.

The present embodiment may employ a hybrid of a heterogeneous element processor (HEP) system using a single microprocessor with up to six threads, T0:T5. Processor pipeline 66 has six stages, matching the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on.

FIG. 3, yet more specifically, provides an architecture block diagram of one embodiment of a programming model for a single thread that may employ the teachings of the disclosed subject matter. Block diagram 70 depicts private instruction caches 72 which receive instructions from AXI Bus 74, which instructions include mixed 16-bit and 32-bit instructions to sequencer 76, user control register 78, and supervisor control register 80 of threads T0:T5. Sequencer 76 provides hybrid two-way superscalar instructions and four-way VLIW instructions to S-pipe unit 82, M-pipe unit 84, Ld-pipe 86, and Ld/St-pipe unit 88. AXI Bus 74 also communicates with shared data cache 90 LD/ST instructions to threads T0:T5. With external DMA master 96 shared data TCM 98 communicates LD/ST instructions, which LD/ST instructions further flow to threads T0:T5. From AHB peripheral bus 100 MSM specific controller 102 communicates interrupt pins with T0:T5, including interrupt controller instructions, debugging instructions, and timing instructions. Global control registers 104 communicates control register instructions with threads T0:T5.

Within the architecture of the single-thread processing as presented in M-pipe 84 of FIG. 3, high-speed mathematical processing occurs. Power-efficiency is critical to the operation of DSP 40, and M-pipe 84 needs to include this consideration in its operation. What occurs in such multiplication process is that the results of a multiplication become available in redundant form, and these redundant results are to be used in multiply-accumulate operations. With such redundant results, sign extension may need to occur on both of the redundant products. The disclosed subject matter provides for sign extension to be applied on only one of the two redundant products of each multiplication. This translates into significant power savings in cases where the intermediate redundant products need to be sign extended over a large bit range.

Similar power-efficient considerations are very likely to exist in any application to which the disclosed subject matter may be applied. Accordingly, the speed with which the Booth multiplication process occurs provides a distinctively novel aspect of the material here disclosed.

The disclosed subject matter provides Booth encoding processes for multiplication that employ a method of partial product generation in which the last row of partial products is '1'-extended. By appropriately manipulating the reduction of the most significant columns of the multiplier's reduction tree, the disclosed process ensures that only the 'sum' redundant product need to be sign extended, while the 'carry' redundant product can be zero extended. Since only the 'sum' is sign extended, the disclosed process and associated structures reduce the power cost involved in sign extending the redundant product of a multiplication. To gain an understanding of how the disclosed subject matter achieves these power savings and related efficiencies, further demonstration of a specific embodiment is here provided.

FIG. 4, therefore, presents a data path diagram 180 for various implementations of the disclosed subject matter and establishes the data flow within which the present Booth multiplication process may take place. In particular, multiplication block 118 receives Rs and Rt input. Within multiplication block 118 are multiplication units M0:M3. In particular, M0 multiplier unit 182, M1 multiplier unit 184, M2 multiplier unit 186, and M3 multiplier unit 188 individually receive Rs and Rt input to generate, respectively, S0C0 (i.e., Sum0 and Carry0), S1C1, S2C2, and S3C3 output to shift/sign-extension unit 148. Shift/sign-extension unit 148 is responsible for logical shifts and sign extension of these intermediate redundant products.

Multiplier block 118 performs the multiplication related instructions for M-pipe 84. These instructions may be treated as compound instructions which use a 16×16 multiplication process as a basis. The multiplier block consists of four 16×16 multiplier units, M0:M3. Each multiplier unit M0:M3 is capable of functioning in several modes, to support the wide variety of M-type instructions. Signed and unsigned modes are supported. The multipliers can also generate the two's complement of their products, in the case when subtraction needs to be performed on the products.

With the disclosed subject matter, M0:M3 multipliers 182 through 188 use radix-4 Booth encoding. In the unsigned mode, they resemble a 17×17 multiplier with the extra 17th bit acting as the sign bit. Except for double precision multiplication (i.e., 32×32 multiplication), all the other multiply instructions are "signed×signed" or "unsigned×unsigned". Computing double precision 32×32 multiplications and 32×16 multiplies using 16×16 multipliers requires "signed× unsigned" and "unsigned×signed" multiplications as well. All of these modes are supported by controlling the sign bits of the multiplicand and the multiplier operands of M0:M3 multipliers 182 through 188.

Output from shift/sign-extension unit 148 goes to multi-operand adder 150 and may be parsed into R0:R3 input. Multi-operand adder 150 receives these R0:R3 inputs and ultimately, after a set of compression and accumulation stages, provides Rdd outputs 170.

Data path 180 may be understood as divisible into four phases. First of all, in the data routing phase data from the Rs and Rt source registers are fed to multiplication block 118. Within multiplication block 118, 16-bit half-words from the source operands are routed to four M0:M3 multiplier units 182 through 188 based on the instruction. Next, partial product generation and reduction vector addition or subtraction occurs wherein M0:M3 multiplier units 182 through 188 generate partial products using radix-4 Booth encoding and reduce them using reduction to a redundant pair of outputs.

During the multi-operand reduction phase, the redundant outputs from multiplication block 118 are input to the multi-operand adder 150 which reduces these inputs and an optional accumulator/round value into two pairs of redundant outputs. Finally, in the addition/saturation phase, redundant outputs are resolved using carry propagate addition, and saturation is performed when applicable.

The disclosed subject matter, therefore, provides for the modified Booth multiplication of such values. With such complex values, the inputs have a real 16-bit value in the low halfword and an imaginary 16-bit value in the high halfword. The multiplier results are optionally scaled by 0-1 bits. A rounding constant is added to each real and imaginary sum. The real and imaginary parts are individually saturated to 32 bits. The upper 16-bits of each of the 32-bit results are packed in a 32-bit destination register.

In this example, S0:S3 and C0:C3 are 33-bits wide. Even though the output of a 16×16 multiplication can be represented in 32-bits, some instructions operate in an unsigned mode and the extra bit is used in this case as the sign bit to facilitate sign extension. S0:S3 and C0:C3 are passed through shift/sign-extension unit 148. S0:S1 and C0:C1 contribute to the lower order 32-bits of the final result, before packing. This forms the real part of the result. These four numbers are optionally scaled by a left shift of 1-bit if specified in the instruction.

The shifted version of these numbers are labeled R0:R3. R0:R3 are passed through multi-operand adder 150. Output from multi-operand adder 150 flows to saturation/addition unit 170.

Now, the disclosed subject matter may be performed in a variety of Booth multiplication processes. However, understanding a specific use of the disclosed subject matter may best be achieved through the presentation of a specific Booth multiplication process in which such an application may arise. Accordingly, FIG. 5 facilitates understanding the Booth multiplication processes of the disclosed subject matter by presenting a modified 16×16 radix-4 Booth multiplication tree applicable to the disclosed subject matter. Dot diagram 200 of FIG. 5 conceptual depicts the radix-4 Booth encoding on 16×16 multipliers of the disclosed subject matter, which results in nine partial products 202, 204, 206, 208, 210, 212, 214, 216, and 218. The nine partial products are reduced to two 33-bit redundant outputs, S0:S3 and C0:C3 using a reduction tree consisting of two levels of 3:2 reduction followed by one level of 4:2 compression. Though 32-bits of precision is sufficient for a 16×16 multiplication, the 33rd bit is also preserved to act as a sign bit in the case of unsigned multiplication. An additional carry-out bit from the 33rd column is also output from the multiplier to aid in sign extension.

Referring further to FIG. 5, each partial product row 220 through 236 is a multiple of the multiplicand bits 238, shown horizontally. Column numbers have been indicated on the top of FIG. 5. The multiplier bits 240 are shown vertically, and these bits are recoded to generate the multiplication factors to form the partial product rows 220 through 236. The signals n0 through n7 shown in FIG. 5 indicate sticky "1"'s which are added to partial product rows 220 through 236 which receive a negative weight. These are sufficient for dealing with multiplication which does not require a final inversion of the product. For handling the case of −(A×B) implicitly in the multiplier, an additional signal n8 is provided.

The signals s0 through s7 handle sign extension when the product of a multiply operation is subtracted implicitly within the multiplier tree. If A and B are assumed to be the multiplicand and the multiplier, respectively, a radix-4 Booth encoding proceeds by encoding groups of three bits of the multiplier operand B and using this encoding to select partial products from the set {−2A, −A, 0, A, 2A}. Now, if the final product, (A×B) needs to be subtracted, then it is equivalent to adding A×−(B), which is, in turn, equivalent to adding the product ((−A)×B). The multiplier is modified; now from B to (−B).

As part of a Booth multiplication process in which the disclosed subject matter may find application, FIG. 6 provides a Booth recoder circuit 250 for implementing the disclosed subject matter. Booth recoder cell 250 includes multiplier group input 252 ranging from LSB input 254 at XOR 256 to MSB input 258 at inverter XOR 260. MSB input 258 also provides "neg" output from Booth recoder circuit 250. Output from XOR 256 represents the A×1 signal, A from Booth recoder 250, as well as provides input to inverter XOR 264. Output from inverter XOR 260 also provides input to inverter XOR 264 to generate the A×2 signal, 2A from Booth recoder circuit 250. XOR 264 provides an output to indicate negation, "neg" from Booth recoder circuit 250. Thus, Booth recoder circuit 250 examines 3-bits of the multiplier B and recodes them into the signals "A", "2A" and "neg". When subtraction needs to be performed, the "neg" signal is inverted to generate the partial products which will produce the two's complement of the product, A×B.

FIG. 7 provides a description of the bit grouping for the logic cell of FIG. 6 with the disclosed subject matter. In particular, radix-4 Booth recoding generates nine (9) multiplication factors from the 16-bit multiplier B, which are used as multiples of A, to generate nine (9) partial products. For "n" ranging from 0 to 8, the table of FIG. 7 determines the Booth multiplication factor for bit groups B[2n+1:2n−1]. For the recoding scheme of the present embodiment, B[−1] is assumed to be zero. B[16] and B[17] are zero if B is an unsigned number, and a sign extension of B if B is a signed number, i.e. B[17]=B[16]=B[15]. The multiplication factors are recoded into three (3) signals; A from XOR 256, 2A from inverter XOR 264 and "neg" from MSB input 262. Thus, when the multiplication factor for A is −2, the signals 2A and neg are high. Similarly, for +1, just A will be high, and all three signals will be low for +/−0. Note, also, that for generating the product A×B, the multiplication factor for the most significant bit group, B[17:15] is always positive. Now, the only possible bit groups for B[17:15] are, [000] or [001] when B is unsigned, and [000] or [111] when B is signed.

From FIG. 7, all these groups lead to a positive multiplication factor. Booth multiplication multiplexers here described, therefore, may select from the set {0, A, 2A} to generate the partial products.

FIG. 8 provides a Booth recoder circuit 270 for implementing Booth recoding logic for the −(A×B) product. Booth recoder cell includes multiplier group input 272 ranging from LSB input 274 at XOR 276 to MSB input 278 at inverter XOR 280. "Subtract" input 282 and MSB input 278 flow to XOR 284. Output from XOR 276 represents the multiplicand A signal from Booth recoder 270, as well as provides input to inverter XOR 286. Output from inverter XOR 280 also provides input to inverter XOR 286 to generate the 2A signal from Booth recoder circuit 270. XOR 284 provides "neg" output from Booth recoder circuit 270.

In the disclosed application of a Booth multiplication process for which the present subject matter may find use, FIG. 8, therefore, takes advantage of the property that the negative value of the product of multiplicand A and multiplier B is obtained by calculating the product of A and the negative value of B. This, therefore, avoids the known two step process of first calculating the product A×B, and then calculating the two's complement of the product to get −(A×B). Booth recoder circuit 270 performs the negation in parallel with the stage of multiplication.

The two's complementation of the product utilizes the fact that −(A×B) is equivalent to A×(−B). In this instance, the operand (−B) is treated as the multiplier. The Booth multiplication factors generated using (−B) as the multiplier are the additive inverses of the corresponding multiplication factors generated using B as the multiplier operand. The Booth multiplication hardware structure used for calculating the product A×B can be reused for calculating A×(−B) by inverting the signs of each of the Booth multiplication factors. This sign is determined by the "neg" signal of Booth recoder circuit 270, which is a modification to the recoding hardware for generating the "−neg" signal in negating the product.

Note that in Booth recoder circuit 270 XOR gate 284 is on a non-critical path, and does not contribute to the critical path. Instead, the critical path includes the multiplier bits for producing the signals A and 2A. This process of inverting the sign of the multiplication factors for partial products introduces cases in which the sign of the last partial product row may be negative. Hence, the signal "n8" may be added to the multiplication tree, as appears in FIG. 5, above. Adding a row may be reduced by modifying the reduction stage to accommodate an additional row. This, however, may infer an additional delay and associated hardware.

The process presented here does not involve an additional row in the reduction stage, but instead focuses on absorbing the n8 signal into the existing nine rows of partial products by making logical modifications to the multiplication tree. The delay added to the multiplication tree is minimal.

Notation that refers to each "dot" of the form $PP_{row\_column}$ aids in obtaining an understanding of this aspect of the disclosed subject matter. Referring to FIG. 9, each binary bit (dot) in the multiplication tree has its unique weight and position in the matrix. All bits in the same column have the same weight, and may be reduced in any order as long as the weights are maintained. The rows are numbered from top to bottom starting at 0, and the columns are numbered from right to left starting at 0. Using this notation, n8 is equivalent to $PP_{10\_16}$. $PP_{0\_16}$, $PP_{0\_17}$, $PP_{0\_18}$ and $PP_{0\_19}$ are generated using scaling and sign extension processes known with radix-4 Booth encoding. With such an approach, it is possible to absorb n8 into the multiplication tree. Thus, by analyzing all the possible bit values for $PP_{0\_16}$, $PP_{0\_17}$, $PP_{0\_18}$ and $PP_{0\_19}$ in both signed and unsigned multiplication modes, the position into which n8 may be inserted is determinable for all possible Booth multiplication factors.

FIG. 9 enumerates the range of values for the four most significant bits of partial product row 0, and the effect of adding a signal n8 to this four-bit field. A MUX structure permits selecting the modified value of the four-bit field when n8 is high. In other words, the disclosed process pre-computes the value of the four most significant bits of partial product row 0 if the signal n8 is added at column 16, i.e., $P_{0\_16}$, and uses this modified four-bit field in the reduction stage. The MUX structure is optimized such that once $PP_{0\_16}$ (shown as "a" in the table) is calculated using standard Booth multiplexing circuitry. The modified four-bit field based on n8 is resolved with a minimal delay after this. The remainder of the multiplication process is identical to the regular multiplication flow for generating the product A×B.

FIG. 10 presents a modified 16×16 radix-4 Booth Multiplication tree applicable to further aspects of the disclosed subject matter. From FIG. 10, it is possible to understand important sign extension and rounding constant functions of the present disclosure. A modification to the reduction stage of the 16×16 multiplier minimizes the critical path through nine partial product rows and provides for sign extension efficiently when the product is available in a redundant sum-carry format. FIG. 10 shows modified reduction tree 304 for a 16×16 radix-4 Booth multiplier. Modified reduction tree 304 accommodates signed and unsigned operands and has the potential to negate the product.

The first stage of reduction reduces nine (9) rows to six (6) rows using three (3) rows of full adders. The second stage of reduction reduces six (6) rows to four (4) rows using two (2) rows of full adders. The third and final stage of reduction employs a row of 4:2 multi-operand adders to reduce four (4) rows to the final redundant sum and carry rows. Though 32 bits of sum and carry are sufficient to represent the 16×16 product, an additional bit ensures sign extension is handled correctly for unsigned multiplication.

FIG. 10 further shows columns 306, which are higher than just the lower 32 bits forming the product. The present disclosure modifies the Booth multiplication tree from column #32 upward to introduce the sign bit s8 for the last partial product row 308. This sign bit s8 is not required if the product does not require sign extension. Now, to preserve the correct sign of partial product row 8, the process includes extending partial product row 308 by the one bit. Columns higher than #32 are unaffected until the last stage of reduction. At such point, the signal ~s8 resolves with the carry-out from column #31, and generates a carry-out 310 shown as "$\bar{c}$".

The final product is formed by adding the carry-out "$\bar{c}$" 310 to the one-extension from column #33 upwards. The effect is to sign-extend the sum component of the final product with $\bar{c}$ as the sign, while zero-extending the carry component of the final product. These steps eliminate the need to sign-extend both the sum and carry components. For example, if 16×16 multiplication were part of a MAC operation, which required an accumulation of a 64-bit value to the 32-bit product, then it would be required to sign-extend the 32-bit product to 64-bits before adding it to the 64-bit number. If the intermediate 32-bit product was left in the redundant form, and the sign extension process here presented is applied, significant power savings may arise because of the possibility of eliminating the MUXes used to sign-extend the carry component over 31-bits.

Referring again to FIG. 10, the present disclosure further provides the ability to add a rounding constant to the multiplier, B. A rounding constant typical to 16×16 multiplications in DSP operations is 0x8000. Rounding the product of a 16×16 multiplication is a common operation, which is typically performed as a two step operation, wherein the multiplier is first used to generate the product, and then the rounding constant is added to the product.

Using the notation explained above, note in FIG. 10 that $PP_{8\_15}$ is 0. By inserting a "1" in this bit position in the multiplication matrix, it is possible to generate the same result that would have been obtained by first generating the product and then adding to the product the value 0x8000. This process also does not add any latency to the critical path.

If the hardware in multiplication block 118 is limited to the capability of just being able to add one accumulate-operand to the product of a multiplication, then it is common to MUX the rounding constant with the accumulate-operand when the product of a multiplication is required to be rounded. This makes it difficult to perform in a single step both rounding and accumulation operations on the product of a multiplication. But, using the process here described eliminates such limitations.

In summary, the disclosed subject matter provides processes for the design and use of a digital signal processor, including processing transmissions in a communications (e.g., a CDMA) system. The disclosed method and system includes a power-efficient sign extension method and system for a Booth multiplication process. The disclosed subject matter introduces a sign bit in a Booth multiplication tree comprising a plurality of partial product rows. The sign bit is useful in the event of the Booth multiplication process requiring a sign extension step. The method and system here disclosed one-extend a predetermined partial product row of the Booth multiplication tree using a sign bit for preserving the correct sign of the predetermined partial product row. Resolving the signal value of the sign bit entails generating a sign-extension bit in the Booth multiplication tree. The sign-extension bit may be positioned in a carry-out column to extend the product of the Booth multiplication process. Then the disclosure forms a final product from the Booth multiplication tree by adding the carry-out value to the sign bit to at least a predetermined column of the Booth multiplication tree. This has the effect of extending the sum component of the final product with the sign bit and zero-extending the carry component of the final product.

The present disclosure further provides the technical advantages of a modified Booth multiplier that is capable of being used in MAC operations of the form [Z+−(A×B)+ rounding constant]. This multiplier minimizes delay, power, and hardware by (a) negating the booth multiplication factors and absorbing an extra sticky bit into the reduction tree, (b) finding a place to stuff a rounding constant into the reduction tree, and (c) using a sign extension process that only requires the sign extension of the redundant sum.

The processing features and functions described herein, moreover, may be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method comprising:
   during a stage of a Booth multiplication operation at a hardware processing device, generating a sign extension bit for a sum portion of a partial product; and
   using an adder to add the sum portion of the partial product to a zero extended carry portion of the partial product to generate a multiplication result.

2. The method of claim 1, wherein the Booth multiplication operation includes generating a plurality of partial product rows, each of the partial product rows having a corresponding sign bit.

3. The method of claim 2, wherein the sign extension bit is generated based on the sign bit corresponding to one of the partial product rows.

4. The method of claim 3, wherein the sign extension bit is generated by adding a carry bit based on the sign bit corresponding to the one of the partial product rows to a one-extended bit of the one of the partial product rows.

5. The method of claim 1, further comprising evaluating a sticky one bit corresponding to a partial product row of the Booth multiplication operation, and based on the evaluated sticky one bit, assigning data bit values to selected bits of a portion of another partial product row.

6. The method of claim 5, further comprising assigning the data bit values to the selected bits using a multiplexer to select the data bit values.

7. The method of claim 1, further comprising generating a data signal using the multiplication result and using a transmitter to transmit the data signal.

8. A method comprising:
   during a stage of a Booth multiplication operation at a hardware processing device, generating a sign extension bit for a sum portion of a partial product associated with a first multiplier to form a sign extended sum portion of the partial product; and
   using an adder to add the sign extended sum portion of the partial product to a value external to the first multiplier.

9. The method of claim 8, further comprising zero extending a carry portion of the partial product associated with the first multiplier.

10. The method of claim 8, further comprising sign extending a sum portion of a second partial product associated with a second multiplier.

11. The method of claim 8, wherein the value is at least one of a second sum portion and a second carry portion generated by a second multiplier.

12. The method of claim 8, further comprising adding a carry portion of the partial product to the value.

13. The method of claim 8, wherein the hardware processing device includes at least one of a processor, a multiplexer, and an accumulator.

14. The method of claim 8, wherein the partial product associated with the first multiplier corresponds to a first portion of a first operand multiplied with a first portion of a second operand, and wherein the value external to the first multiplier corresponds to a second portion of the first operand multiplied with a second portion of the second operand.

15. An apparatus comprising:
sign value resolution circuitry configured to generate a sign extension bit for a sum portion of a partial product during a stage of a Booth multiplication operation; and
multiplication circuitry configured to add the sum portion of the partial product to a zero extended carry portion of the partial product to generate a multiplication result.

16. The apparatus of claim 15, wherein the Booth multiplication operation generates a plurality of partial product rows, each of the partial product rows having a corresponding sign bit.

17. The apparatus of claim 16, wherein the sign extension bit is added to one of the plurality of partial product rows prior to resolving the plurality of partial product rows.

18. The apparatus of claim 16, wherein the sign extension bit is generated based on a sign bit of one of the plurality of partial product rows.

19. The apparatus of claim 16, wherein the sign extension bit is generated by adding a carry bit based on the sign bit of the one of the partial product rows to a one-extended bit of the one of the partial product rows.

20. The apparatus of claim 15, wherein at least one of the sign value resolution circuitry and the multiplication circuitry comprises a device that includes at least one of a processor, a multiplexer, a multiplier, and an accumulator.

21. The apparatus of claim 15, wherein the sign resolution circuitry is further configured to evaluate a sticky one bit corresponding to the partial product, and based on the evaluated sticky one bit, the sign resolution circuitry is configured to assign data values to selected bits of a portion of another partial product.

22. The apparatus of claim 21, further comprising a multiplexer configured to provide the data values at least partially based on the evaluated sticky one bit.

23. An apparatus comprising:
sign value resolution circuitry configured to generate a sign extension bit for a sum portion of a partial product associated with a first multiplier to form a sign extended sum portion of the partial product during a stage of a Booth multiplication operation; and
an adder configured to add the sign extended sum portion of the partial product to a value external to the first multiplier.

24. The apparatus of claim 23, wherein the Booth multiplication operation generates a plurality of partial product rows, each of the partial product rows having a corresponding sign bit.

* * * * *